UNITED STATES PATENT OFFICE.

CARLETON ELLIS, OF MONTCLAIR, NEW JERSEY.

HYDROGEN-FREE CATALYZER AND PROCESS OF MAKING SAME.

1,320,039.

No Drawing.

Specification of Letters Patent.    Patented Oct. 28, 1919.

Application filed January 13, 1917. Serial No. 142,302.

*To all whom it may concern:*

Be it known that I, CARLETON ELLIS, a citizen of the United States, and a resident of Montclair, in the county of Essex and State of New Jersey, have invented certain new and useful Improvements in Hydrogen-Free Catalyzer and Process of Making Same, of which the following is a specification.

This invention relates to a process of making catalytic material and to the product of such process and relates particularly to the production of a catalytic base metal such as nickel in a finely-divided form, in such a condition as to be not readily oxidizable and to the preferred product of such process, namely; pure, finely-divided nickel material of a relatively difficultly oxidizable character.

It has been proposed to prepare catalytic nickel by reduction of a compound thereof in a current of hydrogen and subsequently to treat or react upon the reduced nickel material with carbon dioxid, thereby converting pyrophoric catalyzers into more stable products. According to the present invention a gaseous body is used which is of preferably a substantially inert character, not tending to oxidize the catalytic material.

In my application Serial No. 686,988, filed March 29, 1912, (now U. S. Patent 1,217,118) I have described various forms of catalytic material, among which is one prepared by treating charcoal with a solution containing a metallic salt, the metal of which acts as a catalyzer.

Thus the catalytic compound may be used to precipitate or coat the charcoal with a metallic catalyzing body. To this end, ignition in hydrogen should preferably be carefully controlled as regards temperature because metallic catalyzers are rather sensitive to excessive heating and often lose their effectiveness entirely if overheated.

Salts of nickel may be used in this manner for example, nickel sulfate or acetate. A satisfactory form of nickel catalyzer may be obtained by dissolving nickel hydroxid in a suitable ammonia solution and treating charcoal with this solution. On slight heating, the ammonia is expelled and the nickel compound precipitated on the charcoal. This material is then reduced in a current of hydrogen at relatively low temperature. Nickel nitrate which is sometimes used on a mineral support for preparing a catalyzing body is not as serviceable with charcoal owing to the oxidizing action of the nitric acid (or its decomposition products) thereon. Another manner of preparing the catalyzer is to precipitate a soluble nickel salt with carbonate of soda or its decomposition products or some other precipitant, subsequently collecting the precipitate, adding preferably a little sugar, dextrin or similar carbon containing binding agent and coating charcoal material with the damp mixture (for example by rolling the same) so as to coat the surface of the granules with the insoluble nickel compound.

A catalytic body containing nickel may also be obtained by igniting nickel nitrate on an inert supporting material and reducing in a current of hydrogen at the requisite temperature. Prolonged heating in a current of nitrogen or atmosphere thereof after reduction affords a catalyst which is relatively not easily oxidizable by superheated steam.

The hydrogenation procedure with such a catalyzer may be carried out by bringing hydrogen into contact with the oil and catalyst in any suitable manner.

To recapitulate, my invention relates to the process of making a catalyzer such as a nickel catalyzer in a form which is relatively not readily oxidizable, which process involves reduction of a nickel compound such as nickel nitrate and the like with hydrogen or analogous reducing gas to form the catalytic material and in subsequently exposing the heated mass to the action of an inert gas such as nitrogen whereby a relatively non-oxidizable catalytic material is obtained and my invention further contemplates the product of such process, namely: nickel by hydrogen which has been washed with nitrogen or similar non-oxidizing gas to render it relatively non-oxidizable in character.

What I claim is:—

1. The process of making a catalyzer which comprises reducing a nickel salt with hydrogen and in passing a current of nitrogen over the reduced catalytic material while in a heated state.

2. The process of making a catalyzer adapted for the hydrogenation of fatty oils which comprises incorporating nickel acetate with supporting material, reducing with hydrogen and exposing the heated mixture to the action of a current of nitrogen whereby a catalytic body of a relatively non-oxidizable character is obtained.

3. As a catalyst for the hydrogenation of oils, carbon in comminuted form, carrying reduced nickel thereupon, said product being freed from gases having a reducing action.

4. The process of making a catalyzer which comprises reducing nickel acetate with hydrogen and in passing a current of nitrogen over the reduced heated catalytic material.

5. The process of making a catalyzer adapted for the hydrogenation of fatty oils which comprises incorporating a reducible soluble nickel compound with charcoal supporting material, reducing with hydrogen and exposing the heated mixture to the action of a current of nitrogen whereby a catalytic body of a relatively non-oxidizable character is obtained.

6. As a catalyst for the hydrogenation of oils, carbon in comminuted form, carrying reduced nickel thereupon, said product being freed from gases having a reducing action, said product being impregnated with free nitrogen.

7. The process of making a catalyzer which comprises reducing a nickel salt with a reducing gas and in passing a current of nitrogen over the reduced heated catalytic material.

8. The process of making a catalyzer adapted for the hydrogenation of fatty oils which comprises incorporating nickel compound with supporting material, reducing with hydrogen and exposing the heated mixture to the action of a current of nitrogen whereby a catalytic body of a relatively non-oxidizable character is obtained.

9. The process of making a catalyzer which comprises reducing a metal salt with hydrogen and in passing a current of nitrogen over the reduced heated catalytic material until substantially the entire amount of hydrogen is driven out.

10. As a catalytic material, granular charcoal carrying a coating of reduced nickel in a finely-divided state, freed from reducing gases.

11. As a catalytic material metallic nickel of high purity in a finely-divided state, free from oxids and occluded hydrogen gas, and impregnated with nitrogen gas.

CARLETON ELLIS.